US006778758B1

(12) United States Patent
Endo et al.

(10) Patent No.: US 6,778,758 B1
(45) Date of Patent: Aug. 17, 2004

(54) IMAGE PROCESSING APPARATUS

(75) Inventors: Hiroaki Endo, Yokohama (JP); Shingo Ikeda, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,519

(22) Filed: Sep. 8, 1999

(30) Foreign Application Priority Data

Sep. 11, 1998 (JP) ............................................ 10-258233
Sep. 18, 1998 (JP) ............................................ 10-264570

(51) Int. Cl.$^7$ ................................................ H04N 5/91
(52) U.S. Cl. ............................ 386/95; 386/68; 386/124; 348/451
(58) Field of Search ........................... 386/5–8, 21, 40, 386/68, 81–82, 95, 113, 116–117, 124; 348/451–452, 620–621, 699

(56) References Cited

U.S. PATENT DOCUMENTS 5,825,429 A * 10/1998 Shirahata .................... 348/452
5,999,693 A * 12/1999 Juri et al. .................... 386/68
6,122,017 A * 9/2000 Taubman .................... 348/620
6,307,887 B1 * 10/2001 Gabriel ........................ 348/699
6,374,039 B1 * 4/2002 Hori et al. ................... 386/117
6,631,242 B1 * 10/2003 Seki et al. ................... 386/124

* cited by examiner

*Primary Examiner*—Thai Tran
*Assistant Examiner*—Christopher Onuaku
(74) *Attorney, Agent, or Firm*—Fitzpatrick, Cella, Harper & Scinto

(57) ABSTRACT

The image processing apparatus of this invention is so constructed as to enter the image signal of which one frame is composed of plural interlaced fields each of which is divided into plural blocks each consisting of plural pixels, to interpolate the image signal of a second field utilizing the image signal of a first field in the image signal outputted in the unit of the above mentioned block, and to output the image signal in the unit of the above-mentioned block.

23 Claims, 19 Drawing Sheets

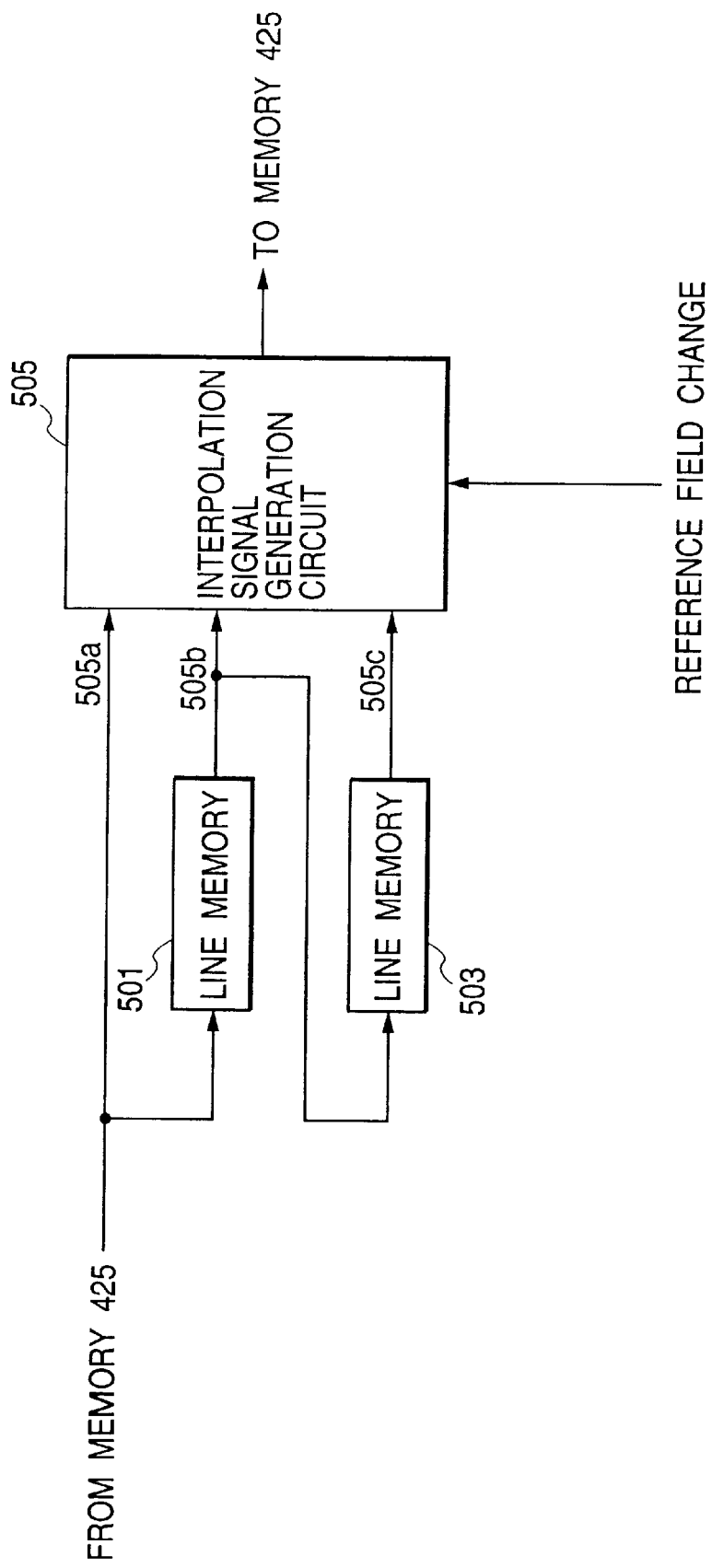

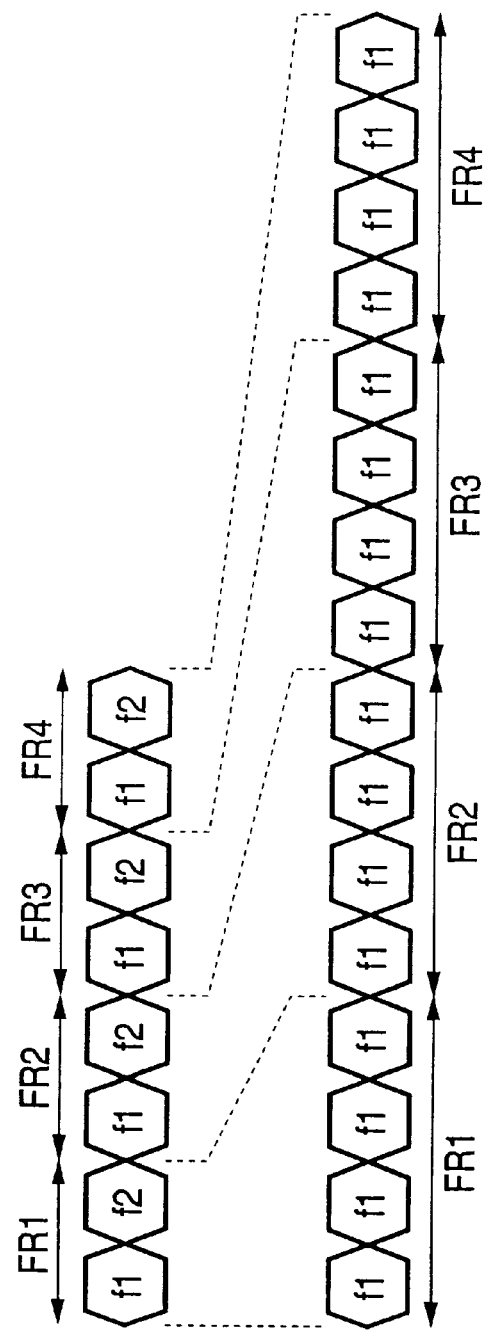

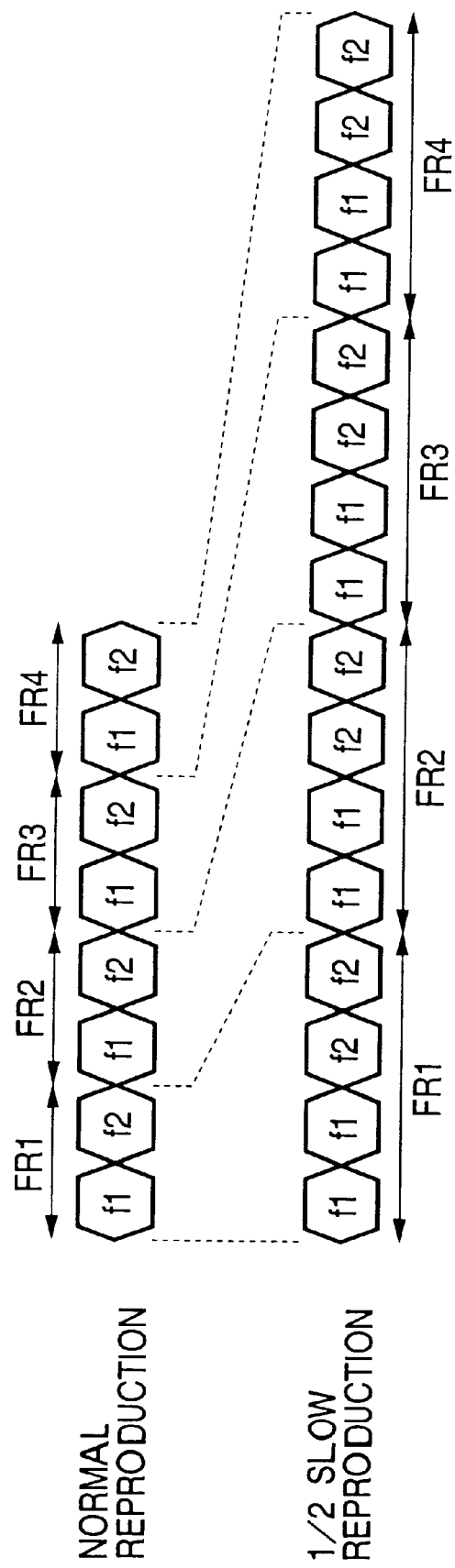

IMAGE PROCESSING APPARATUS

BACKGROUND OF THE INVENTION

1. Field of the Invention

The present invention relates to an image processing apparatus, and more particularly to interpolation process of image.

2. Related Background Art

For obtaining a still image, there have been proposed following various methods, for example.

At first there is conceived a method of writing the image signal of one frame into a memory land reading the image signal of such frame to obtain a still image. However, this method requires a memory of one frame capacity, and the image becomes blurred in case the image shows a motion between two fields constituting the frame.

There is also known a method of writing the image signal of one field into a memory and obtaining the still image of a frame by employing, for one field of the frame, the image signal stored in the memory and, for the other field, interpolating the signal of a line by adopting the image signal of an immediately upper or lower line.

In this method, there is only required the memory capacity of one field and there is no image blur resulting from the motion between the fields. However, though there is obtained an image of one frame in appearance, the resolution in the vertical direction is inferior to that in the above-mentioned method utilizing the frame memory, because two consecutive lines are constituted by a same image signal.

For this reason there is conceived a method of writing the image signal of one frame into a memory and outputting such image signal for example for the first field while, for the second field, detecting the motion between a pixel and the upper and lower lines and selecting either the image signal of the second field or a synthesized image signal according to the detected motion.

More specifically, in the absence of motion, the image signal of the second field is read from the memory and is outputted, but, in the presence of motion, the image signal of a pixel in the second field is interpolated by the image signals of upper and lower nearby pixels of the first field for output.

This method allows to prevent the loss in the vertical resolution and the image blur resulting from the motion between the fields.

However, in case of switching the image of the second field and the interpolated image according to the motion as explained above, there are required image signals of vertically consecutive three pixels for the purpose of motion detection.

For this purpose there is required a memory capable of access at a triple speed, but such high-speed memory is expensive.

Though the motion can also be detected without using such expensive memory, there is required memories of at least two lines, leading to a larger magnitude of circuitry.

There is already known a digital video tape recorder (VTR) capable of recording and reproducing the image signal in a state of digital signal.

Such digital VTR has various functions such as still image reproduction, and, in the following, there will be explained the slow reproduction at a ½ speed among such functions.

In such case, the image signal is reproduced by transporting the magnetic tape at a speed equal to ½ of that at the recording, so that the same image signal is reproduced twice in repetition. Therefore a slow reproduction image of a ½ speed is obtained by storing the reproduced image signal in a memory and reading the image signal of a same frame twice in repetition from the memory.

As the ordinary CRT monitor displays the image of one frame in the state of interlaced images of two fields, the image output from the VTR to the monitor is usually made with conversion into interlaced format.

Therefore, in the aforementioned slow reproduction, if an interlaced conversion process is applied as in the ordinary reproduction, there is obtained an output image as shown in FIG. 19. In this case, after the output of a second field f2 of the frame FR1 as the slow reproduction image, there is outputted a first field f1 of the frame FR1. Consequently the lapse of time in the reproduced image becomes discontinuous so that the reproduced image becomes unnatural.

Such discontinuity in the lapse of time in the reproduced image can be resolved by adopting an order of image reading from the memory as shown in FIG. 20 or 21. More specifically, in the example shown in FIG. 20, the first field f1 alone is outputted in each frame, while, in the example shown in FIG. 21, the first field f1 is outputted twice in repetition and then the second field f2 is outputted twice in repetition for each frame.

In the examples shown in FIGS. 20 and 21, however, the image of one frame is constituted by the either field only, so that the resolution of the reproduced image becomes ½ in comparison with the ordinary reproduction, and a diagonal line in the image cannot be displayed in smooth manner.

SUMMARY OF THE INVENTION

An object of the present invention is to solve the drawbacks mentioned above.

Another object of the present invention is to obtain an interpolated image of high definition without increasing the magnitude of circuitry.

Still another object of the present invention is to obtain a reproduced image of high definition, in reproducing the image from a recording medium.

The above-mentioned objects can be attained, according to an embodiment of the present invention, by an image processing apparatus comprising:

input means for entering an image signal of which one frame is composed of plural interlaced fields, each of which is divided into plural blocks each consisting of plural pixels; and interpolation means for interpolating, among the image signal outputted from the input means in the unit of a block, the image signal of a second field, utilizing the image signal of a first field to output the image signal on the block unit basis.

Still other objects of the present invention, and the features thereof, will become fully apparent from the following detailed description of the embodiments, to be taken in conjunction with the attached drawings.

BRIEF DESCRIPTION OF THE DRAWINGS

FIG. 11 is a block diagram showing the configuration of an interpolation circuit in the apparatus shown in FIG. 9;

FIGS. 19, 20 and 21 are views showing a reproduced image in the conventional slow reproduction.

DETAILED DESCRIPTION OF THE PREFERRED EMBODIMENTS

Now the present invention will be clarified in detail by preferred embodiments, with reference to the attached drawings.

Figure 1:
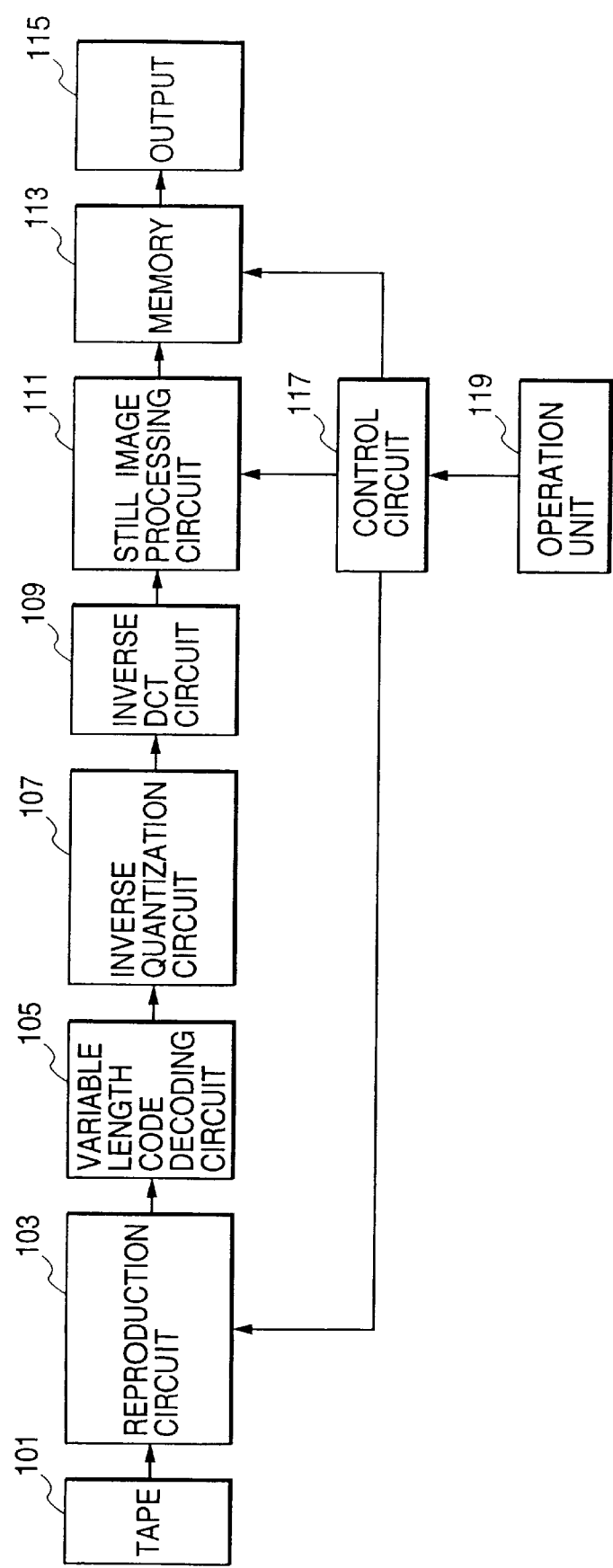
FIG. 1 is a block diagram showing the configuration of a reproduction system of a VTR in which the present invention is applicable.

FIG. 1 is a block diagram showing the configuration of the reproduction system of a video tape recorder (VTR) in which the present invention is applied.

The VTR of the present embodiment reproduces an image signal, which is compressed by known block encoding such as DCT or variable length encoding at the recording operation.

Referring to FIG. 1, a reproduction circuit 103 reproduces the above-mentioned compression encoded image signal from a tape 101, and applies, to such image signal, a known process such as an error correction process utilizing the error correction codes attached during the recording, for supply of the processed image signal to a variable length decoding circuit 105.

The variable length decoding circuit 105 applies a decoding process for the variable length codes, corresponding to the recording operation, to the image signal from the reproduction circuit 103 for output of the processed image signal to an inverse quantization circuit 107. The inverse quantization circuit 107 executes inverse quantization of the reproduced signal according to the quantization coefficients corresponding to the recording operation, for supply to an inverse DCT circuit 109. The image signal of one frame in the present embodiment has been subjected, at the recording, to DCT process in the unit of 8 pixels in the vertical direction by 8 pixels in the horizontal direction. The inverse DCT circuit 109 executes an inverse DCT process on the image signal outputted from the inverse quantization circuit 107, thereby obtaining ordinary image data based on the DCT coefficients.

The image signal outputted from the inverse DCT circuit in the unit of a block is stored, through a still image process circuit 111 to be explained later, in a memory 113. Then the image signal is read from the memory 113 in the order of raster scanning in the interlaced format, and is outputted for example to an external monitor by an output circuit 115.

In the following there will be explained the function in the above-described configuration when the reproduction of a still image is instructed from an operation unit 119.

In response to the instruction for reproducing a still image from the operation unit 119, a control circuit 117 outputs a control signal for temporarily interrupting the transportation of the tape 101 to the reproduction circuit and also outputs a control signal for effecting a still image process to the still image process circuit 111. Also after the writing of an interpolation image signal of one frame, generated as will be explained later, in the memory 113, there is executed control for terminating the writing operation and reading such image signal of one frame in repetition.

Figure 2:
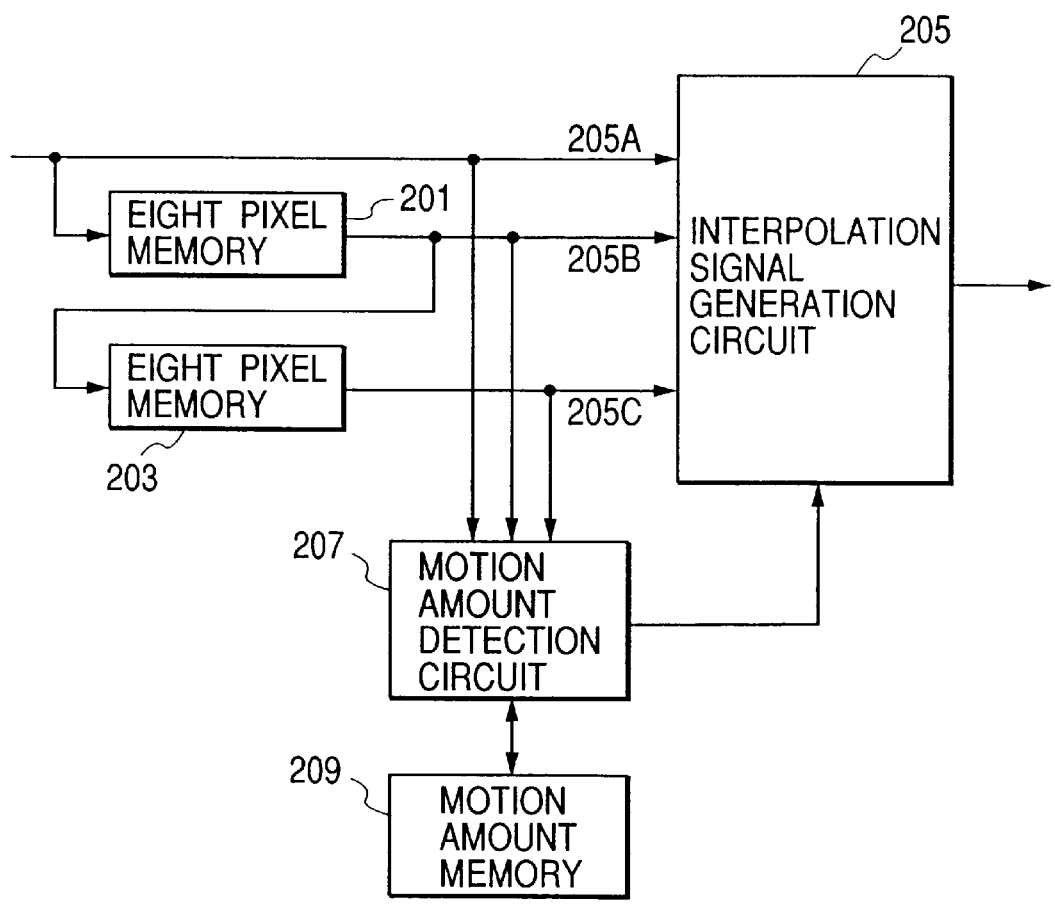
FIG. 2 is a block diagram showing the configuration of a still image processing circuit shown in FIG. 1.

FIG. 2 shows the configuration of the still image process circuit 111.

Figure 3:
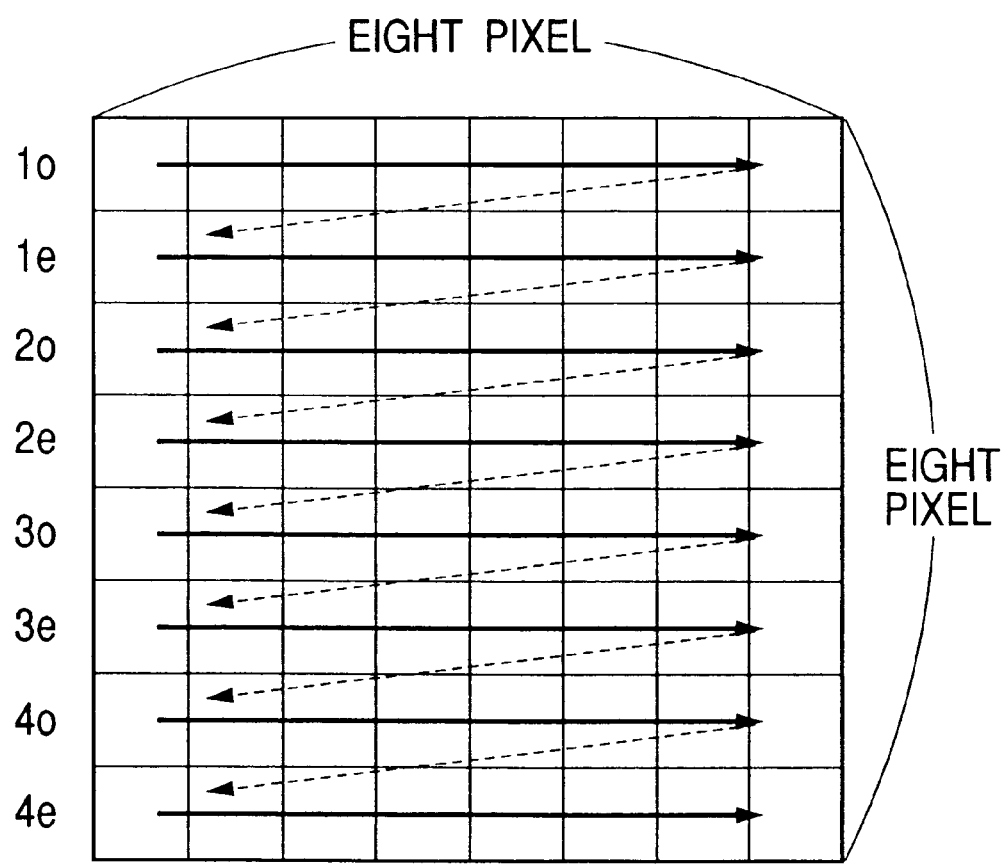
FIG. 3 is a view showing the image signal processed by the circuit shown in FIG. 2.

The image signal subjected to the inverse DCT process in the inverse DCT circuit 109 is outputted in the unit of a block and in the order represented in FIG. 3, and is supplied to an 8-pixel memory 201, a motion amount detection circuit 207 and an interpolation signal generation circuit 205. The 8-pixel memory 201 delays the entered image signal by a period corresponding to 8 pixels, for supply to the interpolation signal generation circuit 205, the motion amount detection circuit 207 and an 8-pixel memory 203. The 8-pixel memory 203 further delays the image signal from the 8-pixel memory 201 by a period corresponding to 8 pixels, for supply to the interpolation signal generation circuit 205 and the motion amount detection circuit 207.

Figure 4:
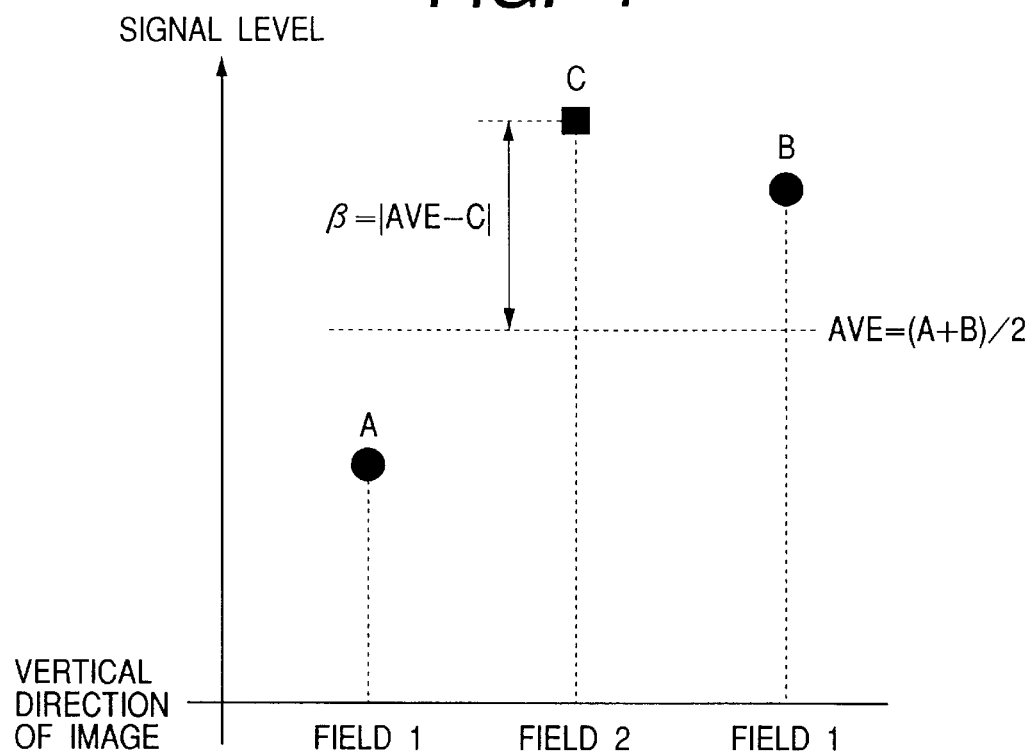
FIG. 4 is a view showing the motion detecting operation in the circuit shown in FIG. 2.

Thus the image signals 205A, 205B, 205C of three pixels consecutive in the vertical direction within a block are outputted to the interpolation signal generation circuit 205 and a motion amount memory 209. The motion amount detection circuit 207 determines, among the image signals of three consecutive pixels as shown in FIG. 4, the difference β between the image signal of the central pixel C and the average AVE of the image signals of the upper and lower pixels A, B and sends the value β as the motion amount to the interpolation signal generation circuit 205 and the motion amount memory 209. The motion amount detection circuit 207 also outputs the difference TH of the pixels A and B to the interpolation signal generation circuit 205.

As shown in FIG. 3, the image signal of each block is composed of image signal of an odd line represented by 1o, 2o, 3o and 3o and image signal of an even line represented by 1e, 2e, 3e and 4e. In the present embodiment, the image signal of the odd field is directly supplied to the memory 113, while that of the even field is used, based on the output of the motion amount detection circuit 207, for generating an interpolation signal by the interpolation signal generation circuit 205, for supply to the memory 113.

The interpolation signal generation circuit 205 synthesizes the image signal of the pixel C and the average AVE of the pixels A and B according to the following equation, based on the motion amount β outputted from the motion amount detection circuit 207 and the difference TH of the image signals of the pixels A, B, thereby obtaining an interpolation signal c:

$$\text{interpolation signal } c\ (1-\alpha)C + \alpha AVE$$

Figure 5:
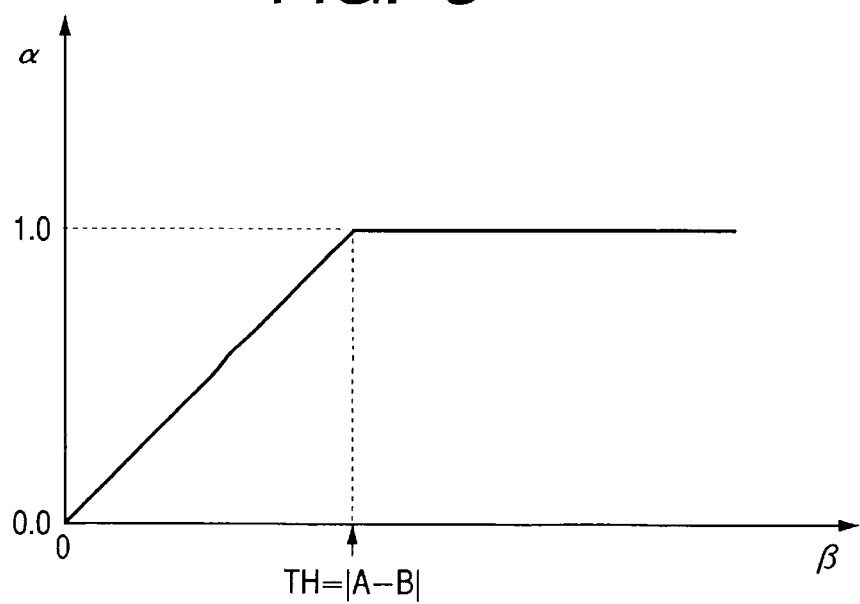
FIGS. 5, 6 and 7 are views showing the function of the circuit shown in FIG. 2.

A value α is a coefficient for determining the proportion of synthesis of the pixel C and AVE. More specifically, the interpolation signal generation circuit 205 varies the value a within a range of 1.0 to 0.0 while the value β varies within a range 0 to TH as shown in FIG. 5.

Figure 6:
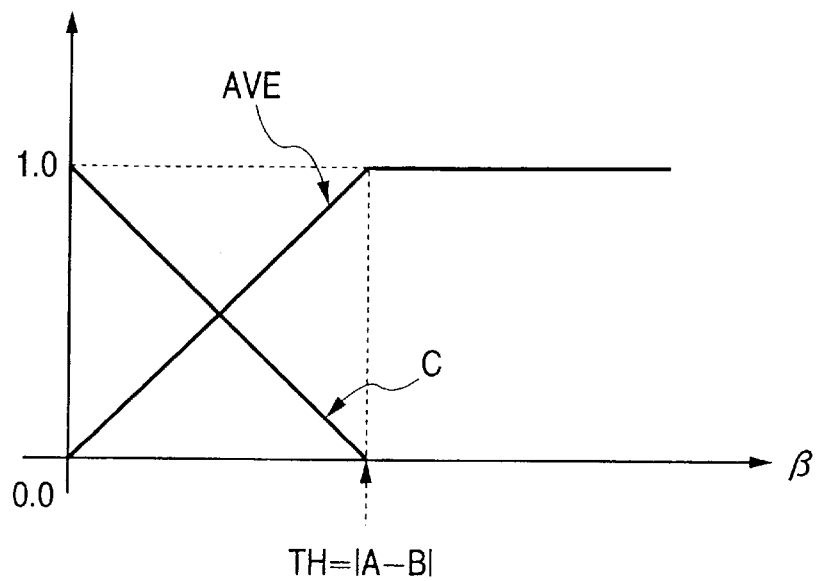

FIG. 6 shows the mode of synthesis of the pixel C and the average AVE.

As shown in FIG. 6, the image signal of the pixel C is directly outputted as the interpolation image signal when the motion amount β is 0, but the proportion of the average AVE is increased with the increase of the motion amount, and the average AVE is directly outputted when β is equal to or larger than TH.

In case the pixel to be interpolated is at the upper or lower end of a block, for example at the line 4e in FIG. 3, and all the three pixels consecutive in the vertical direction cannot be obtained, the motion amount of the image signal of the preceding line, namely 3e, is read from the motion amount memory 209 and the interpolation signal generation circuit 205 generates the interpolation image signal, utilizing the motion amount β of such line 3e.

Similarly, in case the image signals of three pixels within a same block cannot be obtained at end of the block, for example at the pixel in the line 4e in FIG. 3, the interpolation image is generated from the pixels on a line of the pixel to be interpolated, for example from the pixels on the line 4o, stored in the 8-pixel memory 201 or 203.

More specifically, for interpolation for the image signal on the line 4e, the interpolation image signal is obtained by varying the proportion of synthesis of the pixels of the lines 4e and 4o according to the motion.

In the present embodiment, as explained in the foregoing, in obtaining a still image by interpolating the image signal according to the motion, the interpolation process is executed on the image signal in a state of output in the unit of a block from the inverse DCT circuit so that there are only required two 8-pixel memories for the detection of motion to dispense with a line memory.

It is therefore rendered possible to obtain a still image (interpolated image) of high definition without increasing the magnitude of circuitry.

Figure 7:
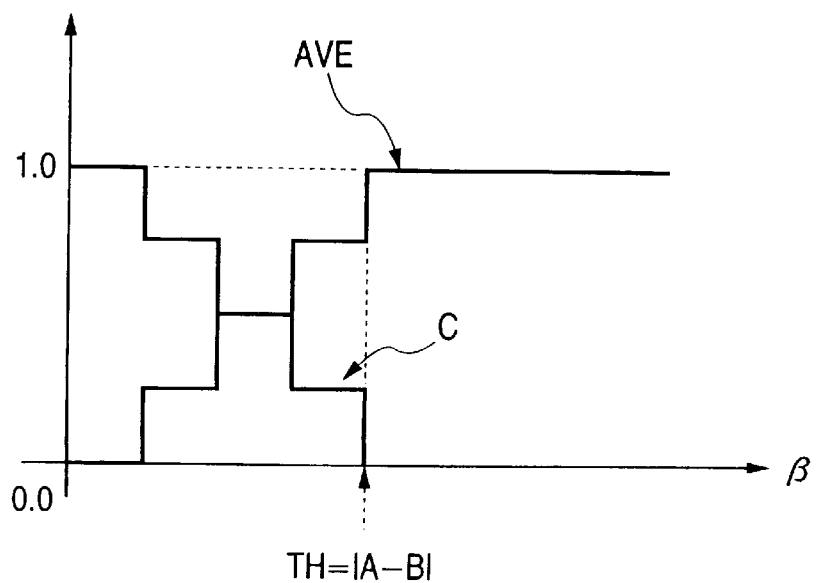

In the present embodiment the interpolated image is generated by continuously varying the value of a as shown in FIG. 5, but it is also possible to generate the interpolation image signal by stepwise varying a as shown in FIG. 7 for the purpose of simplifying the circuit.

Also the present embodiment employs a block of a size of 8×8 pixels, but the block of other sizes may also be adopted. For example, in case of employing a block of m pixels in the vertical direction by n pixels in the horizontal direction, the interpolated image can be similarly generated by providing two n-pixel memories for outputting the image signal of each block as shown in FIG. 3.

Also in the foregoing embodiment, the motion is detected from the pixel C and the average AVE of the pixels A and B, but such form is not restrictive and the motion may also be detected by the difference between the pixel C and the pixel A or by the difference between the pixel C and the pixel B. In such case there is only required an 8-pixel line memory, whereby the magnitude of circuitry can be further reduced in comparison with that shown in FIG. 2.

In the following there will be explained another embodiment of the present invention.

Figure 8:
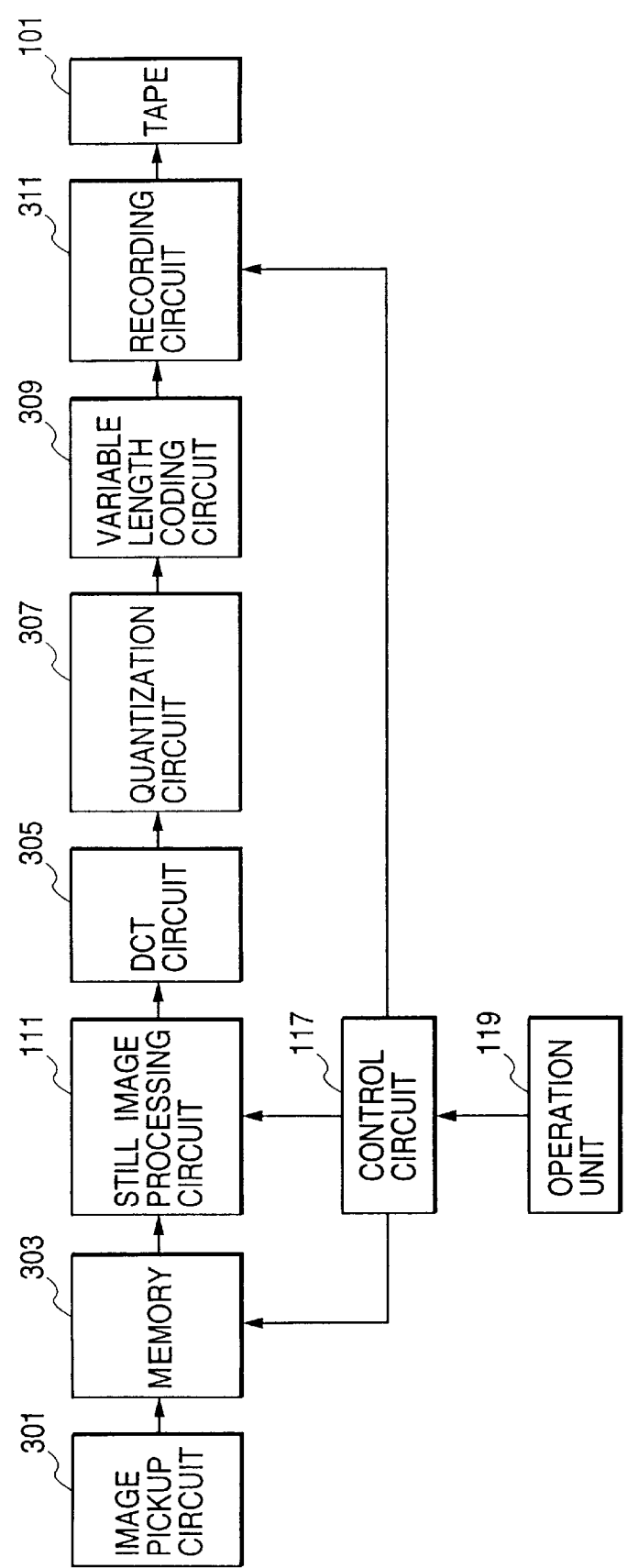
FIG. 8 is a block diagram showing the configuration of a recording system of a VTR in which the present invention is applicable.

FIG. 8 is a block diagram of the recording system of a VTR in which the present invention is applied, wherein components same as those in FIG. 1 are represented by same numbers.

Referring to FIG. 8, an image pickup circuit 301 picks up the image of an object, converts it into an image signal and writes the image signal into a memory 303. A still image process circuit 111 reads the image signal, stored in the memory 303, in the unit of a block of 8×8 pixels and sends the read image signal to a DCT circuit 305. In this operation, the reading of the image signal from the memory 303 is executed in the unit of a block after shuffling into an order suitable for the succeeding DCT process, quantization process and variable length encoding.

A DCT circuit 305 executes a DCT process on the image signal read in the unit of a block, thereby obtaining DCT coefficients for supply to a quantization circuit 307. The image signal outputted from the DCT circuit 305 is quantized in the quantization circuit 307 with quantization coefficients so as to obtain a constant amount of codes for each predetermined number of blocks, then encoded in a variable length encoding circuit 309 and sent to a recording circuit 311. The recording circuit 311 executes a process such as addition of sync signals, error correction encoding and digital modulation to the image signal encoded by the variable length encoding circuit 309 and records the processed image signal on the tape 101.

When an instruction for recording a still image is given by the operation unit 119 in the configuration shown in FIG. 7, the control circuit 117 sends a control signal to the memory 303 for inhibiting the recording signal of the image signal and sends a control signal, indicating such instruction, to the still image process circuit 111.

The still image process circuit 111, having a configuration similar to that shown in FIG. 2, detects the motion of the image signal outputted from the memory in the unit of a block as in the embodiment shown in FIG. 1, and generates an interpolation image signal based on the detected motion.

The still image signal generated by the still image process circuit 111 is supplied to the DCT circuit 305 in the unit of a block as in the ordinary recording, subjected to compression encoding therein and recorded.

Also in the present embodiment, in obtaining a still image by interpolating the image signal according to the motion thereof, the interpolation process is executed in an output state in the unit of a block from the inverse DCT circuit, so that the detection of motion does not require a line memory but can be achieved with two 8-pixel memories only.

An evident effect can be obtained in comparison with the conventional configuration, particularly in case the image pickup element is composed of a CCD of interlaced reading type.

The foregoing embodiment has explained a case of applying the present invention to a VTR, but the present invention is not limited to such application and is likewise applicable to a case of interpolating the image signal processed in the unit of a block, with similar effect.

Also the motion detecting process by the motion detection circuit 207 shown in FIG. 2 and the generation of the interpolation signal by the interpolation signal generation circuit 205 can be realized by a software process of a microcomputer, and the effect of the foregoing embodiment can be obtained also in such case.

In such case, a computer readable memory medium storing the program steps of such software naturally constitutes the present invention.

As explained above, the foregoing embodiments shows to obtain an interpolated image of high definition without increasing the magnitude of circuitry, in case of interpolating the image of a field with that of the other field.

In the following there will be explained another embodiment of the present invention.

Figure 9:
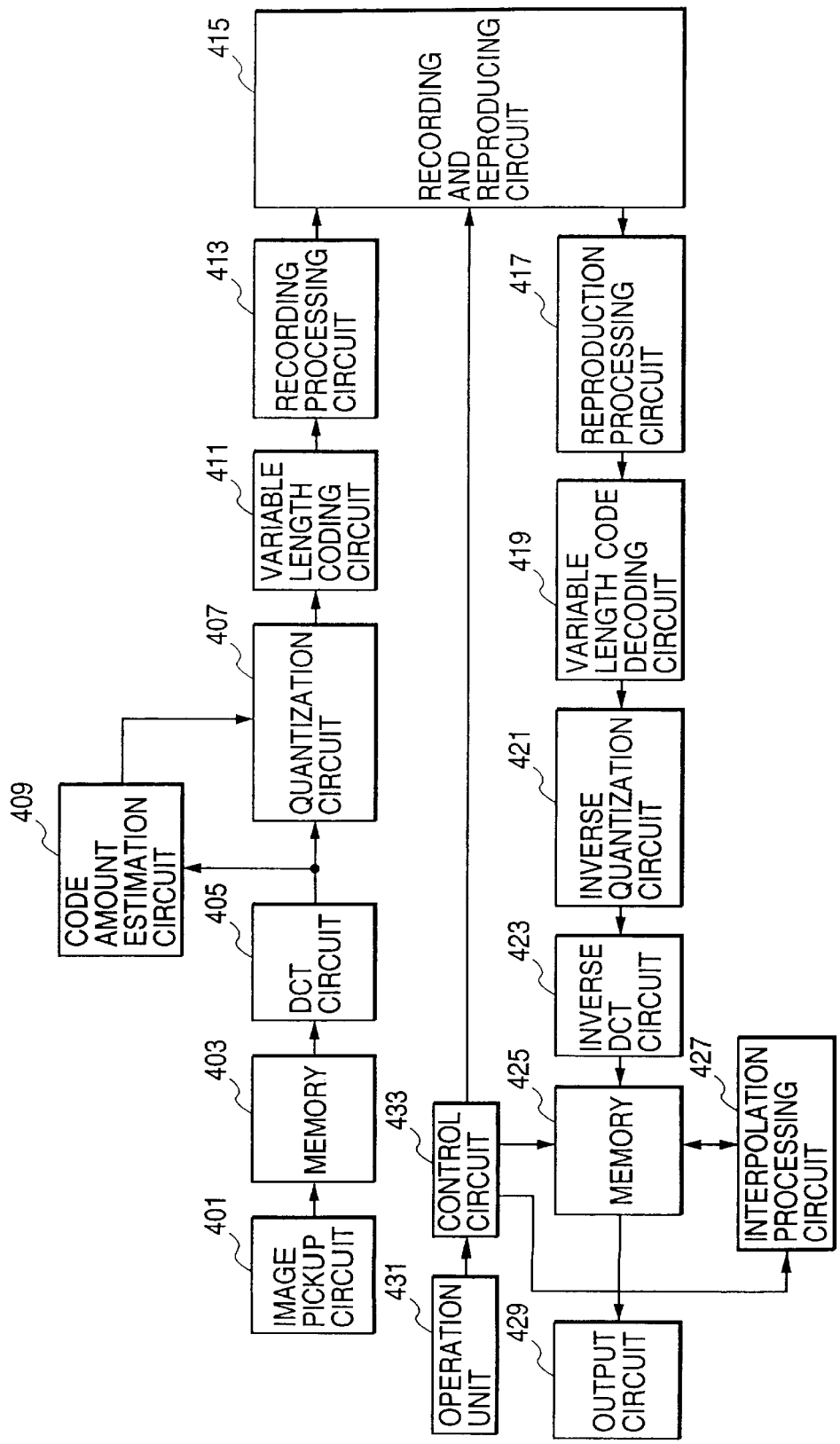
FIG. 9 is a block diagram showing the configuration of a VTR in which the present invention is applicable.

FIG. 9 is a block diagram showing the configuration of a VTR embodying the present invention.

Figure 10A:
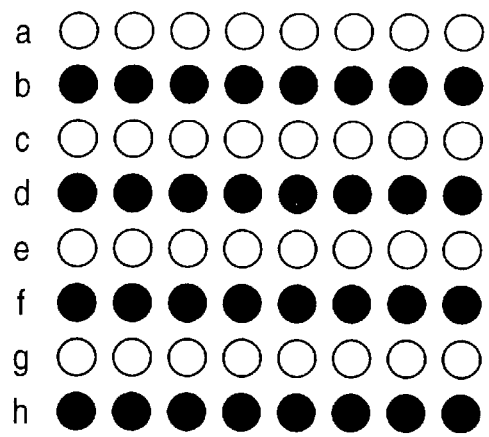
FIGS. 10A, 10B and 10C are views showing the image signal processed by the circuit shown in FIG. 9.
Figure 10B:
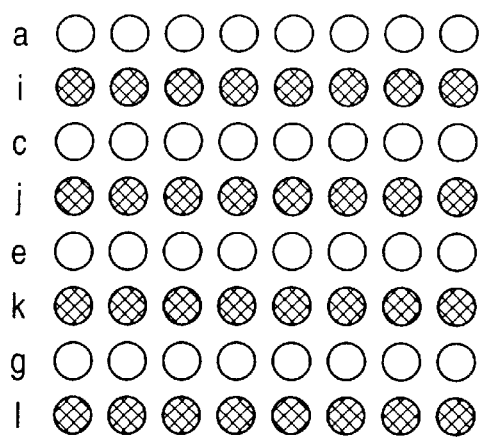
Figure 10C:
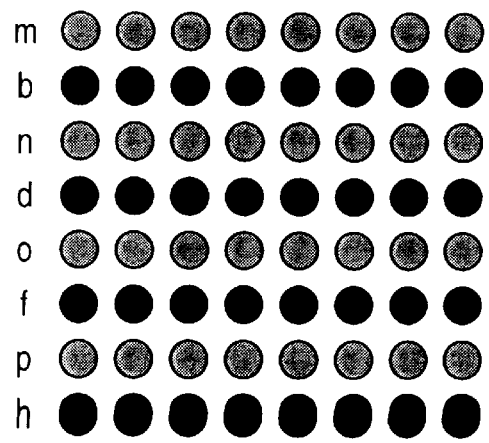

In the normal recording in the configuration shown in FIG. 9, the image signal obtained from an image pickup circuit 401 is stored in a memory 403, which is capable of storing the image signal of plural frames. A DCT circuit 405 reads the image signal stored in the memory 403 in the unit of a block of 8 pixels in the vertical direction by 8 pixels in the horizontal direction, as shown in FIGS. 10A to 10C, executes a DCT process on each block of the image signal and outputs the image signal to a quantization circuit 407 and a code amount estimation circuit 409. In this operation, the DCT circuit 405 executes shuffling suitable for the succeeding compression and encoding.

The code amount estimation circuit 409 estimates the code amount, determines the quantization coefficient to be used in the quantization circuit 407 so as to obtain a predetermined information amount for each predetermined number of DCT blocks, and sends the quantization coefficient to the quantization circuit 407. The quantization circuit 407 quantizes the output of the DCT circuit 405 with the quantization coefficient determined in the code amount estimation circuit 409 and sends the result to a variable length encoding circuit 411, which executes variable length encoding of the quantized image data and sends the result to a recording process circuit 413.

The recording process circuit 413 applies known process such as addition of synchronization signals and ID, error correction encoding and digital modulation to the variable length encoded image data and sends the output to a recording/reproducing circuit 415 which records the image data, outputted from the recording process circuit 413, with a rotary head on a magnetic tape. In this operation, a control circuit 433 outputs a control signal to a mechanism of the recording/reproducing circuit 415, including a capstan, so as to transport the magnetic tape at a predetermined speed.

In the following there will be explained a normal reproducing operation for reproducing thus recorded image data.

In response to an instruction for normal reproduction from an operation unit 431, the control circuit 433 sends a control signal to the recording/reproducing circuit 415 so as to transport the magnetic tape at a speed corresponding to that at the recording. The recording/reproducing circuit 415 reproduces, from the magnetic tape, the compression encoded image signal for supply to a reproduction process circuit 417. The reproduction process circuit 417 executes demodulation of the reproduced data, known process such as the error correction utilizing the error correction codes added during the recording and detection of sync signals and ID data, and outputs the obtained signal to a variable length decoding circuit 419.

The variable length decoding circuit 419 executes, on the image signal from the reproduction process circuit 417, a variable length decoding process corresponding to the encoding process in the recording operation, and sends the resulting signal to an inverse quantization circuit 421. The inverse quantization circuit 421 executes inverse quantization of the reproduced signal utilizing the quantization coefficient corresponding to that employed at the recording operation, and sends the resulting signal to an inverse DCT circuit 423.

As explained in the foregoing, the image signal of one frame in the present embodiment has been subjected, at the recording operation, to a DCT process for each block of 8 pixels in the vertical direction by 8 pixels in the horizontal direction. Therefore the inverse DCT circuit 423 applies an inverse DCT process on the image signal outputted from the inverse quantization circuit 421, thereby obtaining ordinary image data utilizing DCT coefficients.

The image signal outputting from the inverse DCT circuit 423 in the unit of a block is stored in a memory 425 in the order of shuffling at the recording operation, then is read from the memory 425 in the order of interlaced raster scanning, and is outputted by an output circuit 429 for example to an external monitor. An interpolation process circuit 427 executes, as will be explained later, interpolation on the image signal stored in the memory 425 in slow reproduction or still image reproduction, and stores the obtained signal again in the memory 425. The memory 425 is capable of storing the image signal of at least 3 frames, and may naturally be used in common with the memory 403.

In the following there will be explained the function when slow reproduction is instructed from an operation unit 431 in the above-described configuration.

In the following description, it is assumed, for the purpose of simplicity, that the image signal is reproduced at the slow reproduction by transporting the magnetic tape at a speed equal to ½ of the recording speed.

In the digital VTR of the present embodiment, the image signal of a frame is recorded on plural tracks, and, at the slow reproduction, the image signal is reproduced by tracing each track twice in repetition. The control circuit 433 outputs a control signal for causing the interpolation process circuit 427 to execute an interpolation process, and also outputs a control signal for switching the reference field.

The interpolation process circuit 427 executes an interpolation process on the image signal, read from the memory 425, as will be explained later, and stores the obtained signal again in the memory 425. In the present embodiment, the memory 425 is composed of two banks, each capable of storing the image signal of one frame. After the interpolated image signal of one frame is stored in the memory 425 by the interpolation process circuit 427, the control circuit 433 switches the bank for signal read-out to output the interpolated image signal to the output circuit 429.

FIG. 11 is a block diagram showing the configuration of the interpolation process circuit 427.

Referring to FIG. 11, the image signal read from the memory 425 in the order starting from the upper left corner of the image frame is supplied to a line memory 501 and an interpolation signal generation circuit 505. The line memory 501 sends the entered image signal, with a delay of one line period, to a line memory 503 and the interpolation signal generation circuit 505. The line memory 503 sends the image signal from the line memory 501, with another delay of one line period, to the interpolation signal generation circuit 505.

Consequently the interpolation signal generation circuit 501 simultaneously receives the image signals 505a, 505b, 505c of three pixels mutually adjacent in the vertical direction on the image frame.

Figure 12:
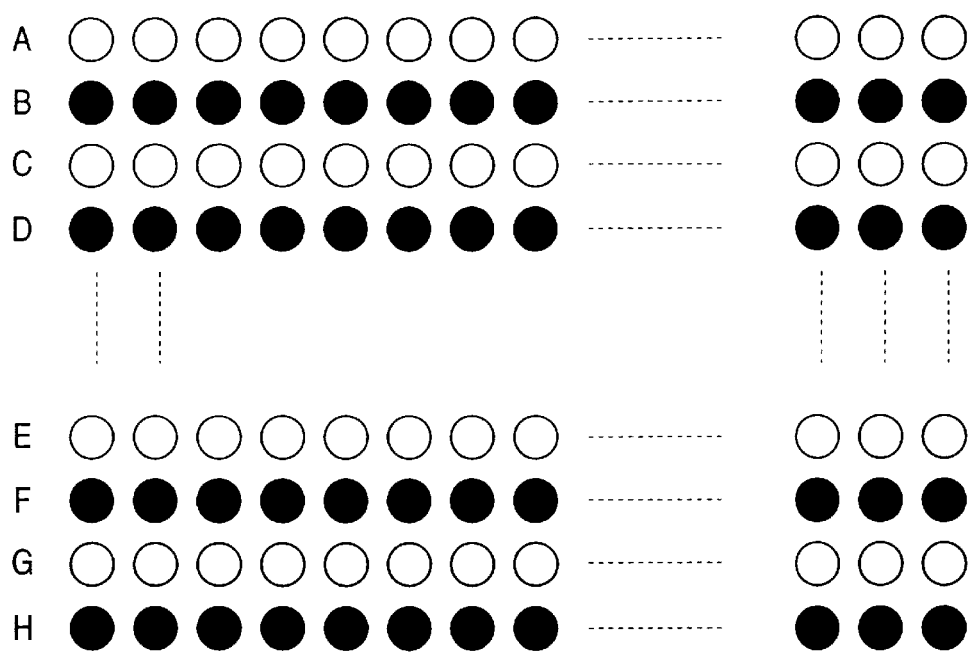
FIG. 12 is a view showing the function of the circuit shown in FIG. 11.

FIG. 12 shows the image signals outputted from the memory 425 to the interpolation process circuit 427.

FIG. 12 shows the image signal of one frame. The image signal is read by the interpolation process circuit 427, in an order starting from the left-hand end pixel in the initial line A, and is then read in the order of line B, C etc. Therefore, the image signals of 3 pixels mutually adjacent in the vertical direction, for example of the lines A, B and C, are simultaneously supplied to the interpolation signal generation circuit 505.

The interpolation signal generation circuit 505 detects the motion between the fields, utilizing such image signals of three pixels, and interpolates the image signal of the other field utilizing the detected motion.

Figure 13:
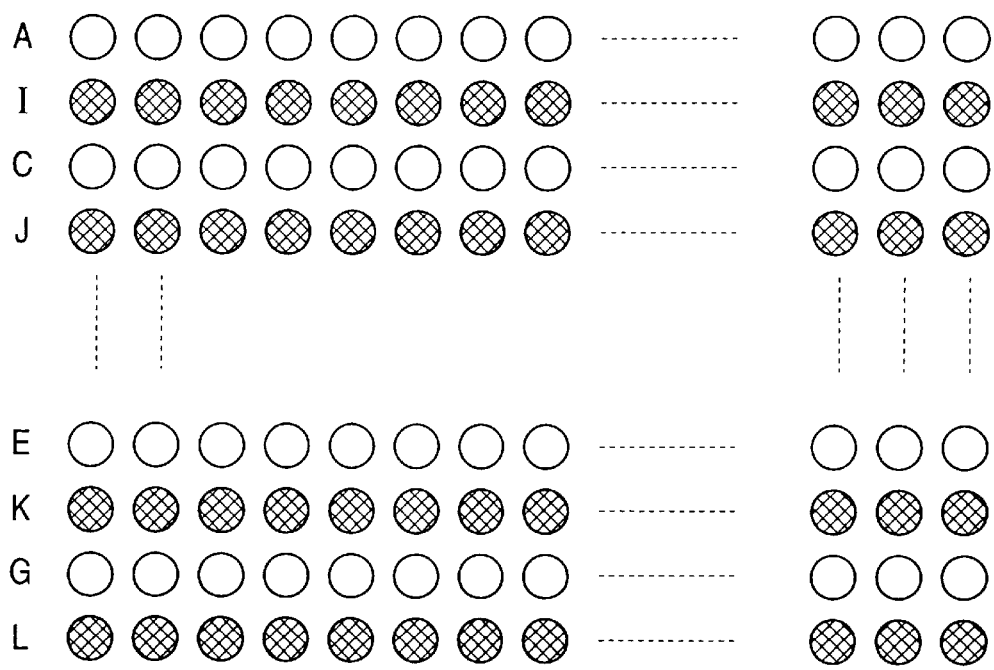
FIGS. 13 and 14 are views showing the interpolation image signal in the circuit shown in FIG. 11.
Figure 14:
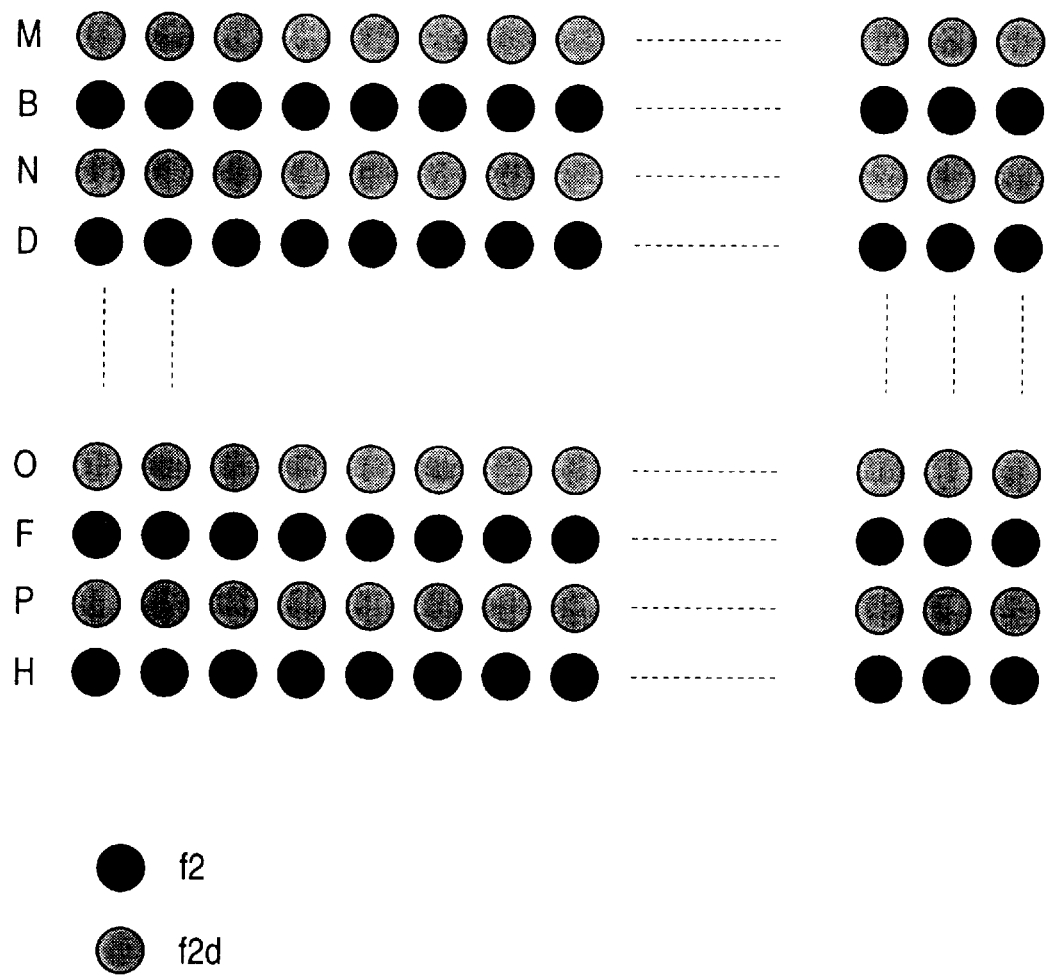

The interpolation signal generation circuit 505 of the present embodiment can be selectively set, by the control signal from the control circuit 433, either in a state of generating an interpolation image signal f1d for a field f2 based on the image signal of a field f1 as shown in FIG. 13, or in a state of generating an interpolation image signal f2d for a field f1 based on the image signal of a field f2 as shown in FIG. 14.

Figure 15:
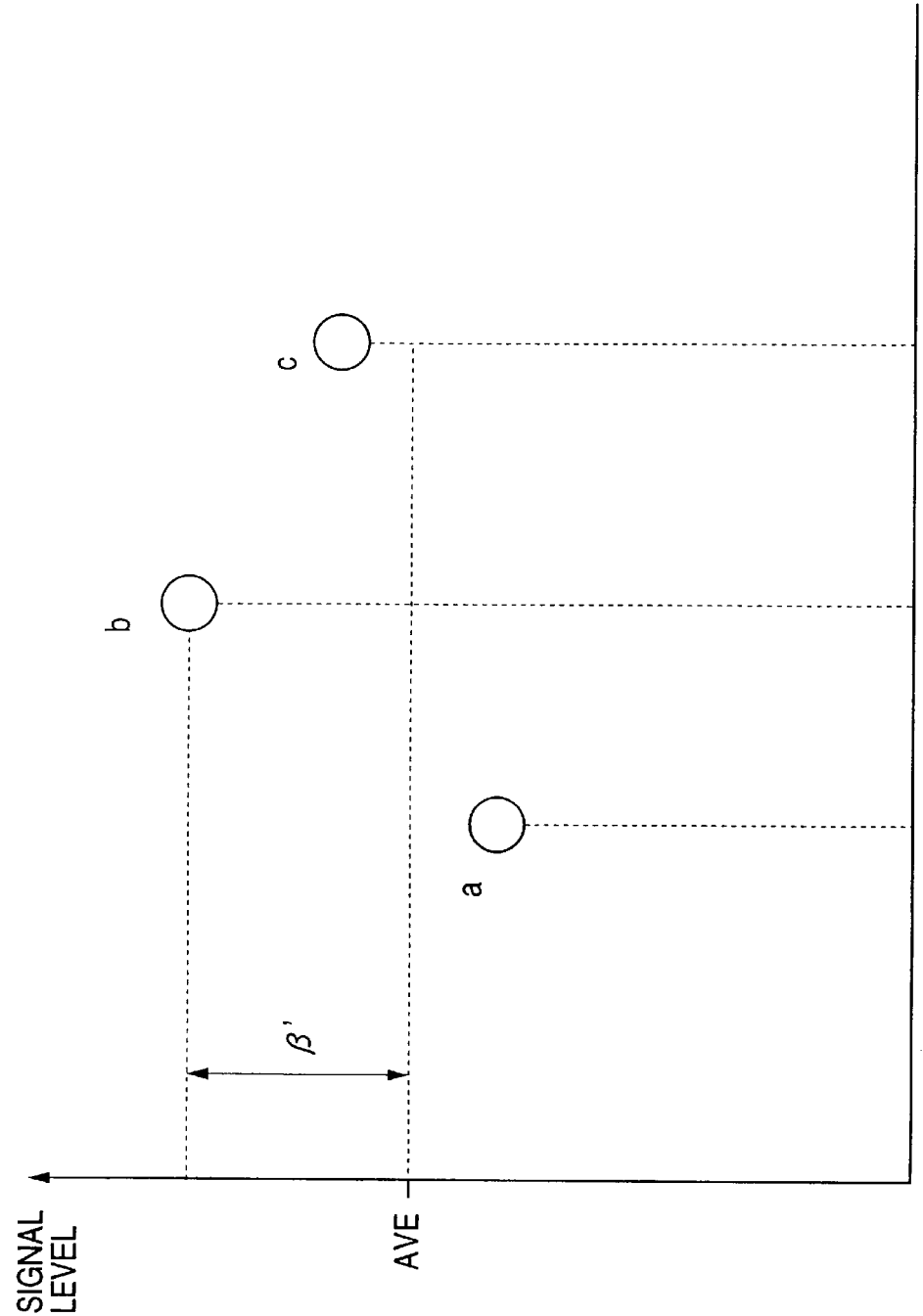
FIG. 15 is a view showing the function of the circuit shown in FIG. 11.

Referring to FIG. 15, the interpolation signal generation circuit 505 determines, from the image signals a, b, c of adjacent three pixels, the difference β' between the image signal value of the central pixel b and the averaged value ave of the upper and lower pixels a, c, then determines a three-value data MOVE by comparing the motion amount β' with a predetermined threshold value, and generates the interpolation image signal based on the detected motion data MOVE. The motion data MOVE assumes a value within a range of 1~3, wherein a value "1" indicates a moving image, a value "2" indicates a still image and a value "3" indicates an intermediate state between the moving image and the still image.

In case upper and lower pixels are available in the adjacent lines as in the case I in FIG. 13 or N in FIG. 14, the interpolation image signal is determined by:

| | |
|---|---|
| I = (A + C)/2 | for MOVE = 1 |
| I = (A + B + C)/3 | for MOVE = 2 |
| I = C | for MOVE = 3 | wherein A, B, C and I are image signal values of the respective pixels.

In case the pixel to be interpolated belongs to the lowermost line in the image frame, as represented by L in FIG. 13, the motion data MOVE is determined from the pixel in the upper adjacent line, namely G in FIG. 13, and the interpolation image signal is determined by:

| | |
|---|---|
| L = G | for MOVE = 1 |
| L = (G + G + H)/3 | for MOVE = 2 |
| L = H | for MOVE = 3 | wherein F, G, H and L are image signal values of the respective pixels.

In case the pixel to be interpolated belongs to the uppermost line in the image frame, as rep resented by H in FIG. 14, the motion data MOVE is determined from the pixel in the lower adjacent line, namely B in FIG. 14, and the interpolation image signal is determined by:

| | |
|---|---|
| M = B | for MOVE = 1 |
| M = (A + B + B)/3 | for MOVE = 2 |
| M = A | for MOVE = 3 | wherein A, B, C and M are image signal values of the respective pixels.

Figure 16:
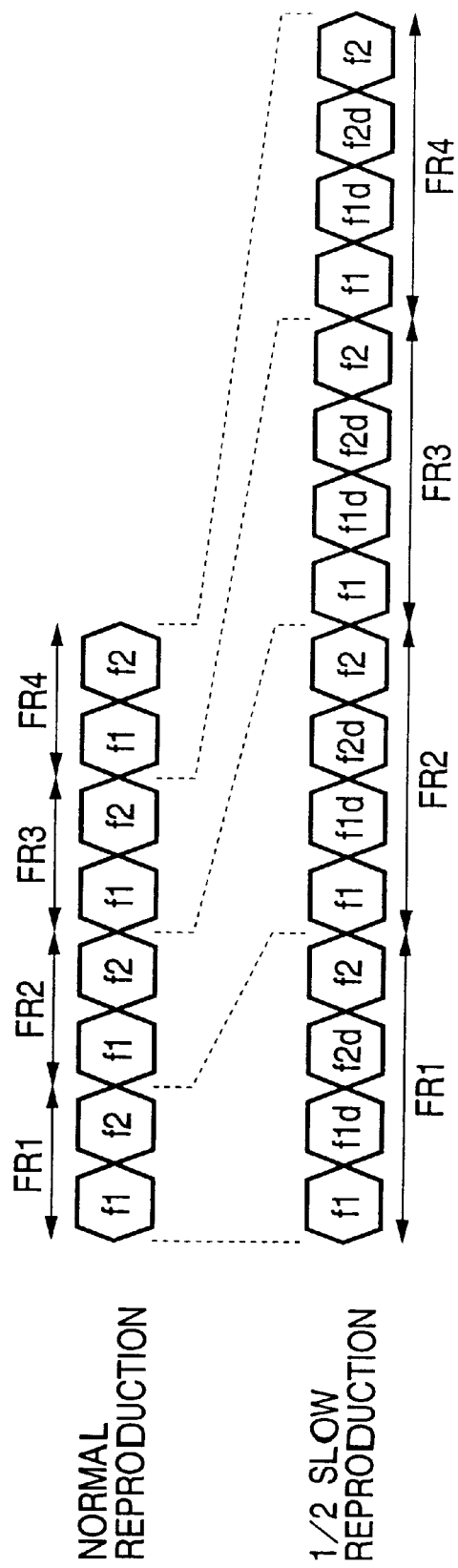
FIG. 16 is a view showing an image outputted from the apparatus shown in FIG. 9.

As explained in the foregoing, the interpolation signal generation circuit 505 is capable of generating an interpolation image signal f1d based on the field f1, and an interpolation image signal f2d based on the field f2. The control circuit 433 outputs the control signal, indicating the switching of the reference field, to the interpolation signal generation circuit 505, in order to output the image signal of respective field as shown in FIG. 16 at the slow reproduction.

More specifically, in the slow reproduction, for the reproduced image signal of a frame FR1, at first an interpolation image signal f2 of a second field is generated utilizing a field f1 as the reference field and the fields f1 and f1d are outputted in succession. Then an interpolation image signal f2d of a first field is generated utilizing a field f2 as the reference field and the fields f2d and f2 are outputted in succession. Such control is repeated for a next field FR2 and thereafter.

In the present embodiment, as explained in the foregoing, the slow reproduction is not achieved by repeating the image of a same field but by interpolating the image of one of the fields according to the motion between the fields. For this reason it is rendered possible to prevent loss in the resolution of the reproduced image in the slow reproduction.

Also in the present embodiment, the reference field for interpolation is switched for each frame. It is therefore rendered possible, in the slow reproduction, to smoothly display a moving image and to obtain a sufficient resolution in a still image.

More specifically, in the present embodiment, after the output of the image of a field f1, there is outputted an interpolated image f1d generated from the field f1 as the reference, as shown in FIG. 16. The field f1d is based on the field f1, reflecting the motion between the fields f1 and f2. Then outputted is an interpolated image f2d generated from the field f2 as the reference. The field f2d also reflects the motion between the fields f1 and f2 but is based on the field f2 as the reference, therefore being closer to the field f2. The image of the field f2 is finally outputted without change.

For example, if the motion between the fields f1 and f2 is large, the image blur between the fields becomes conspicuous if the fields f1 and f2 are simply repeated as shown in FIG. 21. On the other hand, in the present embodiment, the interpolated image is outputted while changing the reference field in each frame, so that the image can be displayed smoothly without blur even if the motion is large.

In the following there will be explained another embodiment of the present invention.

Figure 17:
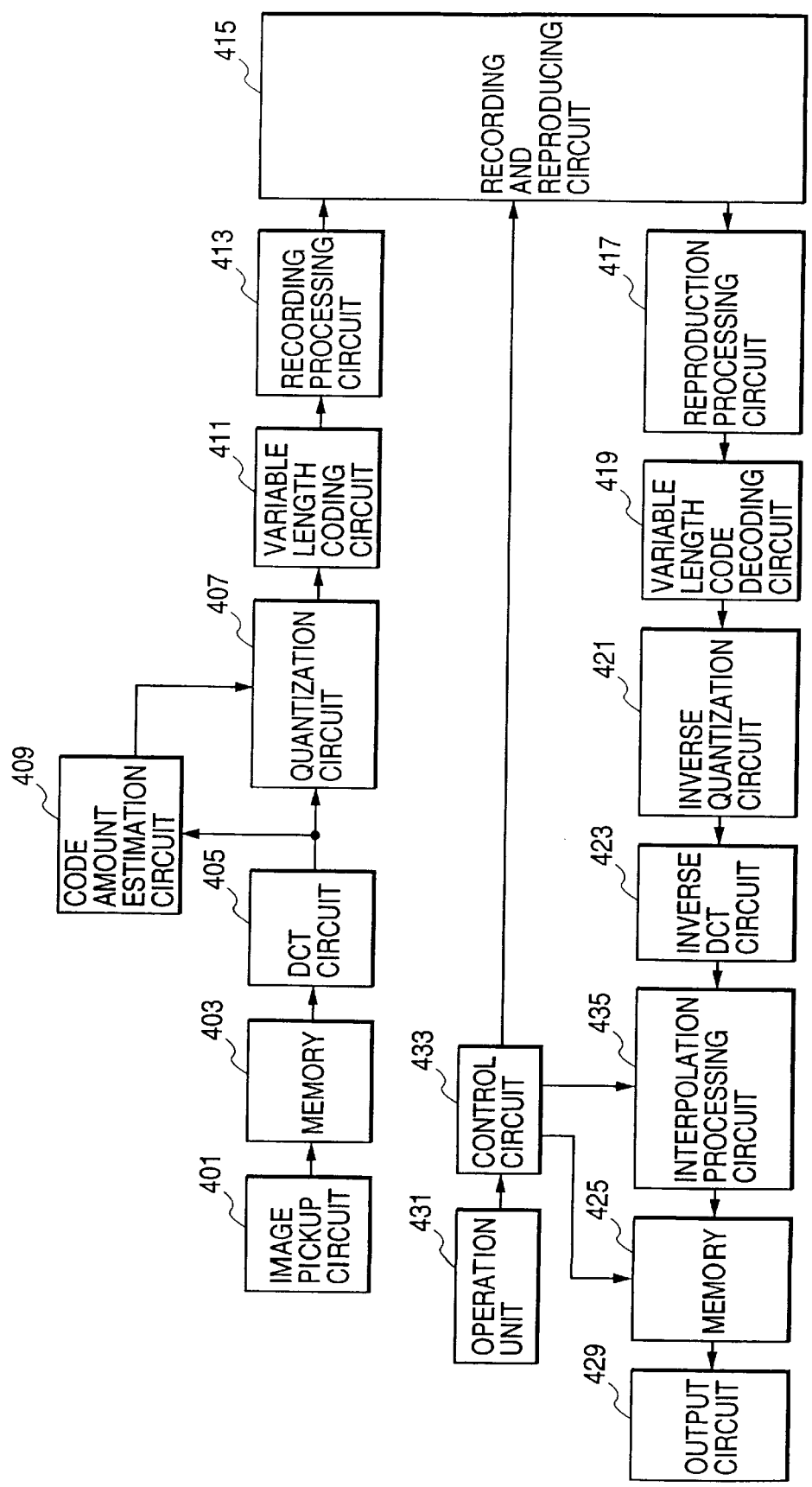
FIG. 17 is a block diagram showing the configuration of a VTR in which the present invention is applied.

FIG. 17 is a block diagram showing the configuration of a digital VTR constituting another embodiment of the present invention, wherein components same as those in FIG. 9 are represented by same numbers.

In the configuration shown in FIG. 9, the image signal from the inverse DCT circuit 423 is once stored in the memory 425 and is then subjected to the generation of the interpolation image signal in the interpolation process circuit 427, but, in the present embodiment, the circuit configuration shown in FIG. 2 is utilized to generate the interpolation image signal by an interpolation process circuit 435 in the course of image signal output from the inverse DCT circuit 423 to the memory 425. The configuration shown in FIG. 17 is same as that in FIG. 9 except for the process of the image signal output from the inverse DCT circuit 423 to the memory 425, so that the detailed description of the configuration will be dispensed with.

Figure 18:
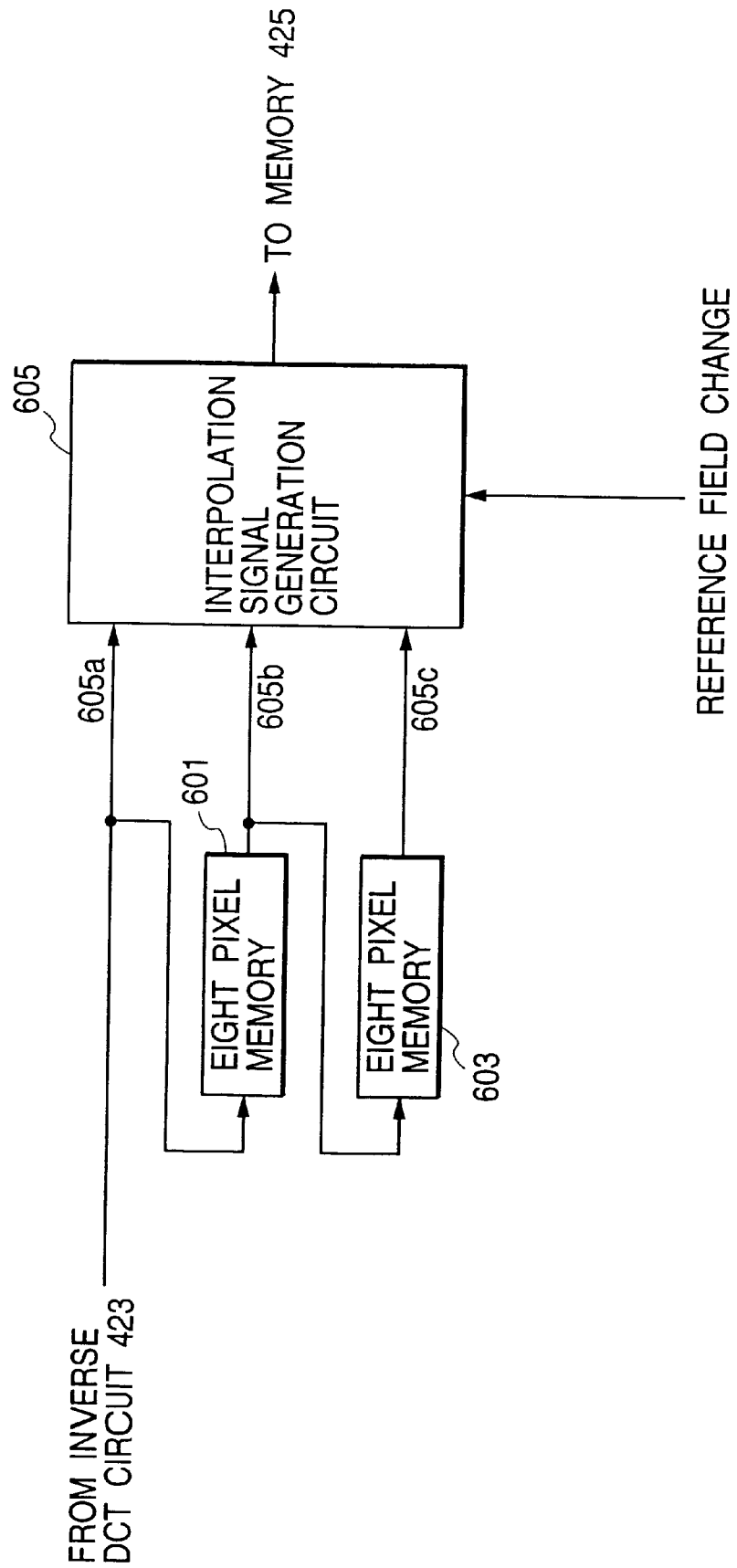
FIG. 18 is a block diagram showing the configuration of an interpolation circuit in FIG. 9.
Figure 19:
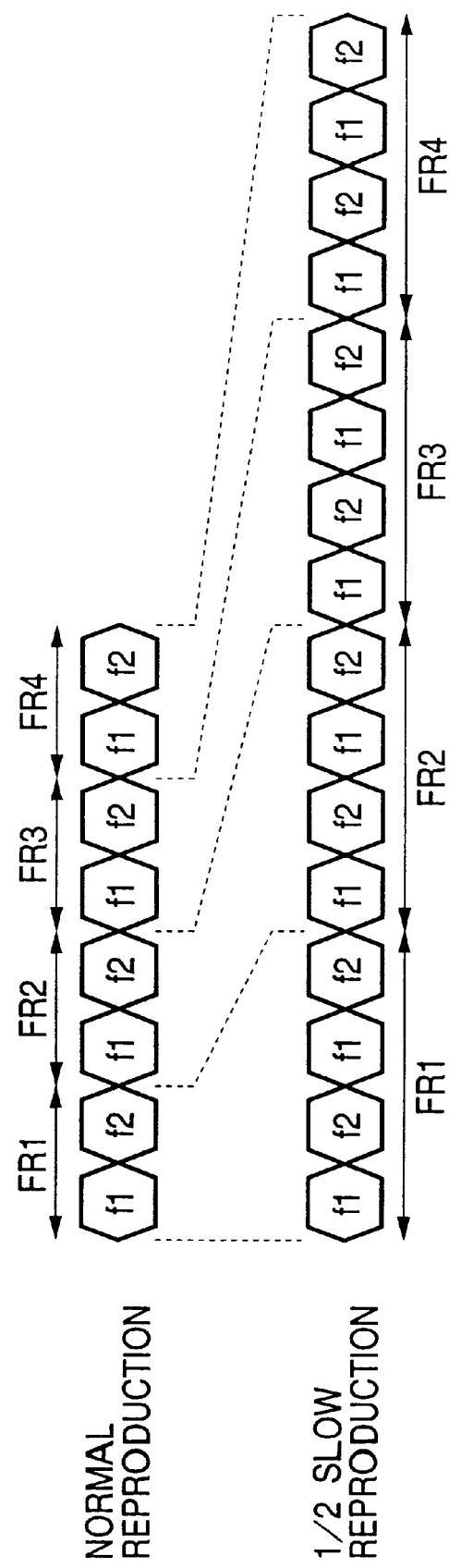

FIG. 18 is a block diagram showing the configuration of the interpolation process circuit 435.

In the present embodiment, the DCT process is executed on each block consisting of 8×8 pixels. The inverse DCT circuit 423 outputs the image signal in the unit of a block of 8×8 pixels in the order shown in FIG. 3 to the interpolation process circuit 435.

The image signal outputted from the inverse DCT circuit 423 is supplied to an 8-pixel memory 601 and an interpolation signal generation circuit 605. The 8-pixel memory 601 sends the input image signal, with a delay of a period of 8 pixels, to an 8-pixel memory 603 and the interpolation signal generation circuit 605. The 8-pixel memory 603 sends the image signal outputted from the 8-pixel memory 601, with another delay of a period of 8 pixels, to the interpolation signal generation circuit 605.

Consequently the interpolation signal generation circuit 605 simultaneously receives the image signals 605a, 605b, 605c of three pixels mutually adjacent in the vertical direction on the image of the same block.

FIGS. 10A to 10C show the image signals outputted from the inverse DCT circuit 423 to the interpolation process circuit 435.

FIG. 10A shows the image signal of a block outputted from the inverse DCT circuit 423. She signal is read from the inverse DCT circuit 423 to the interpolation process circuit 435 in the sequential manner starting from the pixel at the left-hand end of the initial line a and then lines b, c etc. Consequently the interpolation signal generation circuit 605 simultaneously receives the image signals of three pixels which are mutually adjacent in the vertical direction for example in the lines a, b and c, as shown in FIG. 10A.

The interpolation signal generation circuit 605 detects the motion between the fields, utilizing the image signals of these three pixels in the same manner as in the foregoing embodiment shown in FIG. 11, and interpolates the image signal of the other field based on the detected motion.

Also the interpolation signal generation circuit 605 of the present embodiment can be selectively set, as in the circuit shown in FIG. 11, either in a state of generating an interpolation image signal f1d for the field f2 based on the image signal of a field f1 as reference, as shown in FIG. 10B, or in a state of generating an interpolation image signal f2d for the field f1 based on the image signal of a field f2, as shown in FIG. 10C, according to the control signal from the control circuit 433.

As shown in FIG. 15, the interpolation signal generation circuit 605 determines, from the image signals a, b, c of adjacent three pixels, the difference β' between the image signal value of the central pixel b and the averaged value ave of the upper and lower pixels a, c, then determines a three-value data MOVE by comparing the motion amount β' with a predetermined threshold value, and generates the interpolation image signal based on the detected motion data MOVE. The motion data MOVE assumes a value within a range of 1 to 3, wherein a value "1" indicates a moving image, a value "2" indicates a still image and a value "3" indicates an intermediate state between the moving image and the still image.

In case upper and lower pixels are available in the adjacent lines as in the case i in FIG. 10B or n in FIG. 10C, the interpolation image signal is determined by:

| | |
|---|---|
| i = (a + c)/2 | for MOVE = 1 |
| i = (a + b + c)/3 | for MOVE = 2 |
| 1 = c | for MOVE = 3 | wherein a, b, c and i are image signal values: of the respective pixels.

In case the pixel to be interpolated belongs to the lowermost line in the image frame, as represented by l in FIG. 13, the motion data MOVE is determined from the pixel in the upper adjacent line, namely g in FIG. 10A, and the interpolation image signal is determined by:

| | |
|---|---|
| l = g | for MOVE = 1 |
| l = (g + g + h)/3 | for MOVE = 2 |
| l = h | for MOVE = 3 | wherein f, g, h and l are image signal values of the respective pixels.

In case the pixel to be interpolated belongs to the uppermost line in the image frame, as represented by m in FIG. 10C, the motion data MOVE is determined from the pixel in the lower adjacent line, namely b in FIG. 10A, and the interpolation image signal is determined by:

| | |
|---|---|
| m = b | for MOVE = 1 |
| m = (a + b + b)/3 | for MOVE = 2 |
| m = a | for MOVE = 3 | wherein a, b, c and m are image signal values of the respective pixels.

Thus the interpolation signal generation circuit 605 is capable of generating an interpolation image signal f1d based on the field f1, and an interpolation image signal f2d based on the field f2. The control circuit 433 outputs the control signal, indicating the switching of the reference field, to the interpolation signal generation circuit 605, in order to output the image signal of respective field as shown in FIG. 16 at the slow reproduction.

Thus processed image signal of each field is stored in the memory 425. The control circuit 435 controls the image signal read-out from the memory 425 in order to output the image signal as shown in FIG. 15 at the slow reproduction.

In the present embodiment, as explained in the foregoing, the slow reproduction is not achieved by repeating the image of a same field but by interpolating the image of one of the fields according to the motion between the fields. For this reason it is rendered possible to prevent loss in the resolution of the reproduced image in the slow reproduction.

Also in the present embodiment, the reference field for interpolation is switched for each frame. It is therefore rendered possible, in the slow reproduction, to smoothly display a moving image and to obtain a sufficient resolution in a still image.

Furthermore, in the present embodiment, the interpolation process is applied to the image signal outputted from the inverse DCT circuit 423. Consequently the interpolation process circuit 435 receives the image signal in the unit of a block, and can therefore be composed of 8-pixel memories as shown in FIG. 2 or 18, instead of a line memory, whereby the magnitude of the circuit can be significantly reduced.

In the present embodiment, the encoding is executed by dividing the image signal into blocks each having a size of 8×8 pixels, but such embodiment is not restrictive and the present invention is likewise applicable to an apparatus which records or reproduces the image signal by dividing it into blocks, each having a size of m pixels in the vertical direction by n pixels in the horizontal direction. In such case, the interpolation process circuit shown in FIG. 18 can be provided with memories for causing a delay of n pixels instead of the 8-pixel memories.

Furthermore, an effect similar to that of the present embodiment can also be obtained in case a frame is composed of three or more fields or in case the slow reproduction is conducted with a speed other than half of the recording speed, by suitably setting the timing of changing the reference field and the order of output of the interpolation image signals.

Furthermore, the motion detection process and the interpolation signal generating process by the interpolation signal generation circuit shown in FIGS. 11 and 18 can also be executed by a software process utilizing a microcomputer, with similar effects to those in the foregoing embodiments.

In such case the computer readable memory medium storing the program steps of such software constitutes the present invention.

As explained detailedly in the foregoing, the embodiments of the present invention allow to obtain optimum interpolated images according to the state of the reproduced image.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus comprising:
   a reproduction unit that reproduces, from a recording medium, an image signal of which one frame is composed of plural interlaced fields;
   an interpolation unit that interpolates, among the plural fields, the image signal of one field included in the frame by utilizing the image signal of another field included in the same frame; and
   a mode setting unit that sets a mode of said apparatus between a first mode in which said interpolation means interpolates the image signal of a first field of the frame by utilizing the image signal of a second field included in the same frame, and a second mode in which said interpolation unit interpolates the image signal of the second field of the frame utilizing the image signal of the first field of the same frame.

2. An apparatus according to claim 1, wherein said mode setting unit alternately changes the first mode and the second mode in a slow reproduction mode.

3. An apparatus according to claim 1, wherein said interpolation unit comprises a motion detection unit that detects a motion between an image of the one field of the frame and an image of the other field of the same frame, and a mixing unit that mixes the image signal of the one field of the frame and the image signal of the other field of the same frame according to a detection result of said motion detection unit.

4. An apparatus according to claim 3, wherein said interpolation unit outputs one of the image signal of the other field of the frame and a mixed image signal obtained by said mixing unit as an interpolation image signal for the image signal of the other field.

5. An apparatus according to claim 3, wherein said interpolation unit outputs one of the image signal of the one field of the frame and a mixed image signal obtained by said mixing unit as an interpolation image signal for the image signal of the other field.

6. An apparatus according to claim 1, wherein the image signal reproduced by said reproduction unit is divided into plural blocks each consisting of plural pixels of the plural interlaced fields, and wherein said interpolation unit interpolates the one field of the frame outputted by said reproduction unit in the unit of the block and outputs an interpolated image signal in the unit of the block.

7. An apparatus according to claim 6, wherein the image signal is encoded in the unit of the block.

8. An apparatus according to claim 1, wherein said mode setting unit periodically changes the first mode and the second mode at a predetermined interval relative to a reproduction speed of the image signal by said reproduction unit.

9. A reproducing apparatus comprising:
   a reproduction unit that reproduces, from a recording medium, an image signal of a frame composed of plural interlaced fields;
   an interpolation unit that interpolates, among the plural fields constituting one frame of the image signal reproduced by said reproduction unit, the image signal of one field of the frame by utilizing the image signal of a reference field of the same frame; and
   a control unit that changes over a mode of said interpolation unit between a first mode in which said interpolation unit interpolates the image signal of a first field of the frame by utilizing the image signal of a field other than said first field, and a second mode in which said interpolation unit interpolates the image signal of a second field of the frame by utilizing the image signal of a field other than said second field.

10. A reproducing apparatus according to claim 9, wherein said control unit changes over the first mode and the second mode according to a predetermined order in a slow reproduction mode.

11. A reproducing apparatus according to claim 9, wherein said interpolation unit includes synthesis means adapted to detect motion between the image of said one field and the image of said reference field, and to synthesize the image signal of said one field and the image signal of said reference field according to the result of said motion detection.

12. A reproducing apparatus according to claim 11, wherein said interpolation unit includes holding means capable of holding said reproduced image signal for a predetermined period and detects the motion, utilizing the image signal to be supplied to said holding means and the image signal outputted from said holding means.

13. A reproducing apparatus according to claim 11, wherein said interpolation unit is adapted to selectively output the image signal of said one field and said synthesized image signal as the interpolation signal for the image signal of said second field.

14. A reproducing apparatus according to claim 11, wherein said interpolation unit outputs one of the image signal of the one field of the frame and a mixed image signal as an interpolation image signal for the image signal of the other field.

15. A reproducing apparatus according to claim 9, wherein said interpolation unit includes a memory for storing the image signal of said one field, the image signal of the reference field and the interpolation signal for the image signal of said one field, and is adapted to selectively read, from said memory, the image signal of said one field, the image signal of said reference field, and said interpolation signal.

16. A reproducing apparatus according to claim 9, wherein said reproduced image signal is divided into plural blocks each consisting of plural pixels, and said interpolation unit is adapted to execute said interpolation on the image signal outputted from said reproduction unit in the unit of a block and to output in the unit of said block.

17. A reproducing apparatus according to claim 9, wherein said control unit periodically changes over the first mode and the second mode at a predetermined interval relative to a reproduction speed of the image signal by said reproduction unit.

18. A reproducing apparatus comprising:
   reproduction means for reproducing an image signal of a frame divided into plural blocks each consisting of plural pixels, wherein the image signal is encoded in the blocks;

interpolation means for executing interpolation on the image signal outputted from said reproduction means in the unit of a said block and for outputting the image signal in the unit of a said block;

mode setting means for setting the reproduction mode of said apparatus among plural modes including a moving image reproducing mode and a still image reproducing mode; and control means for controlling the function of said interpolation means according to the mode set by said mode setting means;

wherein said control means is adapted to control said interpolation means so as to output said image signal in a said block unit without said interpolation in said moving image reproducing mode and to output said image signal in a said block unit with said interpolation in said still image reproducing mode.

19. A reproducing apparatus comprising:

a reproducing unit that moves a recording medium and reproduces an image signal from the recording medium;

an interpolation unit that executes interpolation on the image signal outputted from said reproducing unit;

a mode setting unit that sets a reproduction mode of said apparatus among plural modes including a normal reproducing mode in which said reproducing unit moves the recording medium at a normal speed and a slow reproducing mode in which said recording medium is moved at a speed slower than said normal speed; and a control unit for controlling the function of said interpolation unit according to the mode set by said mode setting unit;

wherein said control unit is adapted to control said interpolation unit so as to output said image signal without said interpolation in said normal reproducing mode and to output said image signal with said interpolation in said slow reproducing mode.

20. An apparatus according to claim 19, wherein the image signal reproduced by said reproducing unit has plural frames each composed of plural interlaced fields, and said interpolation unit interpolates, among the plurality of fields constituting one frame of the image signal, the image signal of one field of the frame by utilizing the image signal of another field of the same frame.

21. An imaging apparatus comprising:

imaging means for picking up an object image and outputting an image signal divided into plural blocks each consisting of plural pixels;

interpolation means for executing interpolation on the image signal outputted from said image pickup means in a unit of a said block and outputting the interpolated signal in the unit of said block;

mode setting means that sets a recording mode of said apparatus among plural modes including a moving image recording mode and a still image recording mode; and control means that controls an interpolation operation of said interpolation means according to the recording mode set by said mode setting means, wherein said control means is adapted to control said interpolation means so as to output said image signal in the unit of the block without said interpolation in said moving image recording mode and to output said image signal in the unit of the block with said interpolation in said still image recording mode.

22. An imaging apparatus according to claim 21, wherein said recording means comprises:

encoding means that encodes the image signal, outputted from said interpolation means, in the unit of the block, and said recording means records the image signal encoded by said encoding means.

23. A reproducing apparatus comprising:

a reproducing unit that reproduces an image signal of a frame composed of plural interlaced fields from a recording medium;

an interpolating unit that executes interpolation on the image signal outputted from the recording medium, wherein said interpolation unit interpolates, among the plurality of fields, the image signal of one field of the frame by utilizing the image signal of another field of the same frame;

a mode setting unit that sets a reproduction mode of said reproducing unit between a plurality of reproduction modes including a normal reproducing mode in which said reproducing unit reproduces the image signals at a normal reproducing speed, and a slow reproducing mode in which said reproducing unit reproduces the image signal at a speed slower than the normal reproducing speed; and a control unit that controls the function of said interpolating unit according to the reproduction mode of said reproducing unit, wherein said control unit is adapted to control said interpolation unit so as to output the image signal without said interpolation in said normal reproducing mode and to output said image signal with said interpolation in said slow reproducing mode.

\* \* \* \* \*

UNITED STATES PATENT AND TRADEMARK OFFICE
CERTIFICATE OF CORRECTION

PATENT NO. : 6,778,758 B1
DATED : August 17, 2004
INVENTOR(S) : Hiroaki Endo et al.

It is certified that error appears in the above-identified patent and that said Letters Patent is hereby corrected as shown below:

<u>Title page,</u>
Item [56], References Cited, U.S. PATENT DOCUMENTS,
"6,631,242 B1 *     10/2003     Seki et al. ... 386/124" should read
-- 6,631,242 B1 *     10/2003     Kubota et al. ... 386/124 --.

<u>Column 1,</u>
Line 13, "land" should read -- and --; and
Line 45, "allows to prevent" should read -- prevents --.

<u>Column 2,</u>
Line 27, "the" should be deleted; and
Line 36, "definition" should read -- definition, --.

<u>Column 3,</u>
Line 56, "for,supply" should read -- for supply --.

<u>Column 4,</u>
Line 49, "$3_o$ and $3_o$" should read -- $3_o$ and $4_o$ --; and
Line 64, "interpolation signal c $(1-\alpha)C+\alpha AVE$" should read -- interpolation signal c = $(1-\alpha)C+\alpha AVE$ --.

<u>Column 5,</u>
Line 1, "value a" should read -- value $\alpha$ --;
Line 41, "value of a" should read -- value of $\alpha$ --; and
Line 43, "varying a" should read -- varying $\alpha$ --.

<u>Column 6,</u>
Line 60, "shows" should read -- shows how --.

<u>Column 9,</u>
Line 44, "rep resented" should read -- represented --.

<u>Column 11,</u>
Line 13, "She" should read -- The --; and
Line 64, "by 1" should read -- by $\ell$ --.

UNITED STATES PATENT AND TRADEMARK OFFICE
CERTIFICATE OF CORRECTION

PATENT NO. : 6,778,758 B1
DATED : August 17, 2004
INVENTOR(S) : Hiroaki Endo et al.

It is certified that error appears in the above-identified patent and that said Letters Patent is hereby corrected as shown below:

Column 12,
Lines 3-5,
"1 = g         should read    -- $\ell$ = g
 1 = (g+g+h)/3                $\ell$ = (g+g+h)/3
 1 = h"                           $\ell$ = h --; and
Line 7, "and 1" should read -- and $\ell$ --.

Column 13,
Line 9, "allow" should read -- allow one --.

Signed and Sealed this

Fourth Day of January, 2005

JON W. DUDAS
*Director of the United States Patent and Trademark Office*